B. H. SMITH.
ELECTRICAL MEASURING INSTRUMENT.
APPLICATION FILED JULY 19, 1917.

1,355,515.

Patented Oct. 12, 1920.
3 SHEETS—SHEET 1.

WITNESSES:
Olen E. Bee
J. H. Procter

INVENTOR
Benjamin H. Smith
BY
Merley G. Carr
ATTORNEY

B. H. SMITH.
ELECTRICAL MEASURING INSTRUMENT.
APPLICATION FILED JULY 19, 1917.

1,355,515.

Patented Oct. 12, 1920.
3 SHEETS—SHEET 3.

WITNESSES:
Olen E. Bee
J. H. Procter

INVENTOR
Benjamin H. Smith
BY
Wesley E. Carr
ATTORNEY

UNITED STATES PATENT OFFICE.

BENJAMIN H. SMITH, OF TURTLE CREEK, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,355,515.    Specification of Letters Patent.    Patented Oct. 12, 1920.

Application filed July 19, 1917. Serial No. 181,522.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Electrical Measuring Instruments, of which the following is a specification.

My invention relates to electrical measuring instruments and particularly to direct-current watthour meters of the oscillating type.

One object of my invention is to provide a direct-current watthour meter that shall have means whereby the current winding may be supplied with current through a current shunt.

Another object of my invention is to provide a direct-current watthour meter that shall have magnetic material in the field circuit of its windings.

A further object of my invention is to provide a meter of the above indicated character that shall be small in structure, simple and inexpensive to construct and effective in its operation.

In practising my invention, I provide an indicating instrument, an integrating device, a clutch for periodically connecting the integrating device to the instrument, and an oscillating device actuated by the clutch-controlling device for periodically rendering the indicating instrument inoperative. Since the amplitude of movement of the indicating instrument is proportional to the power traversing the instrument and, since the indicating device is connected to the instrument for uniform intervals of time, the integrating device is actuated in accordance with the power to be measured. By reason of the fact that the indicating instrument is rendered inoperative periodically, the magnetic materials in the circuit thereof are always worked on a predetermined portion of the magnetization current and the ill effects of magnetic remanence are not apparent. The use of an instrument having such magnetic circuits permits the operating currents to be relatively small, and, consequently, it may be operated from a current shunt.

Figure 1:
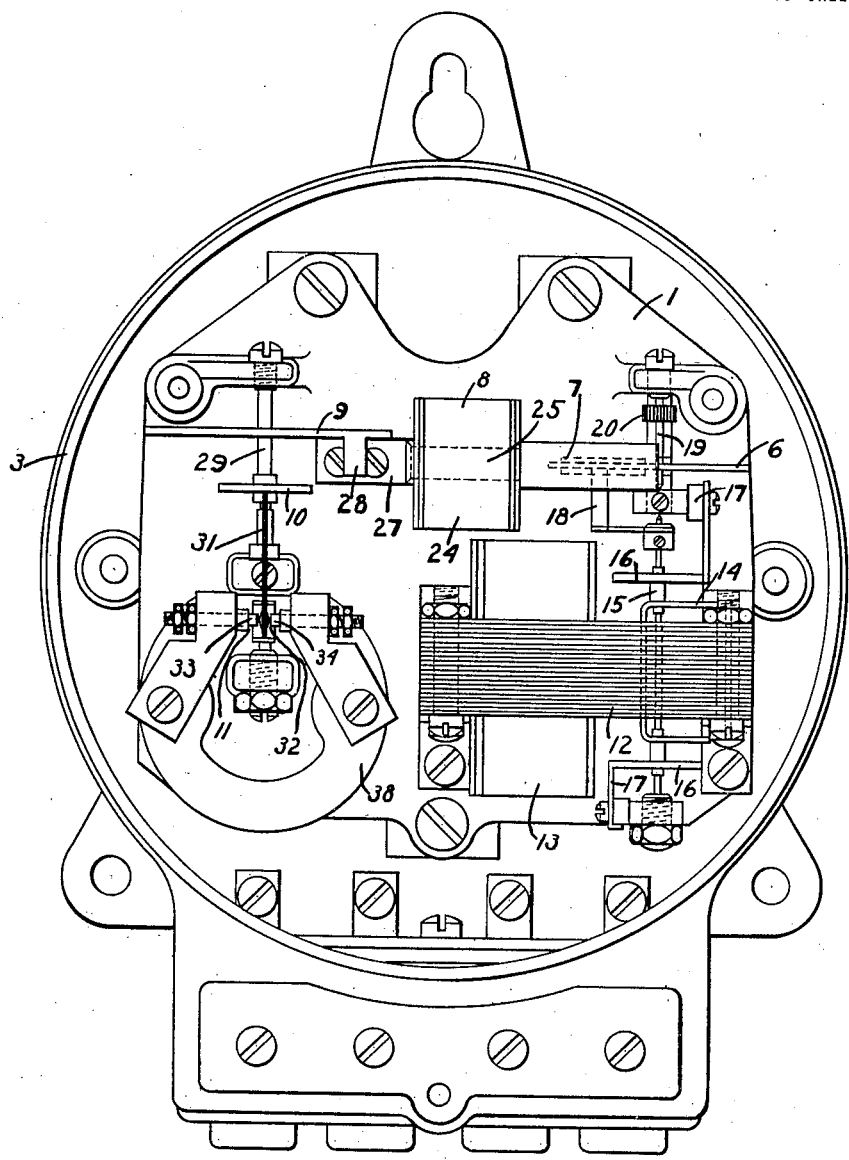
Figure 2:
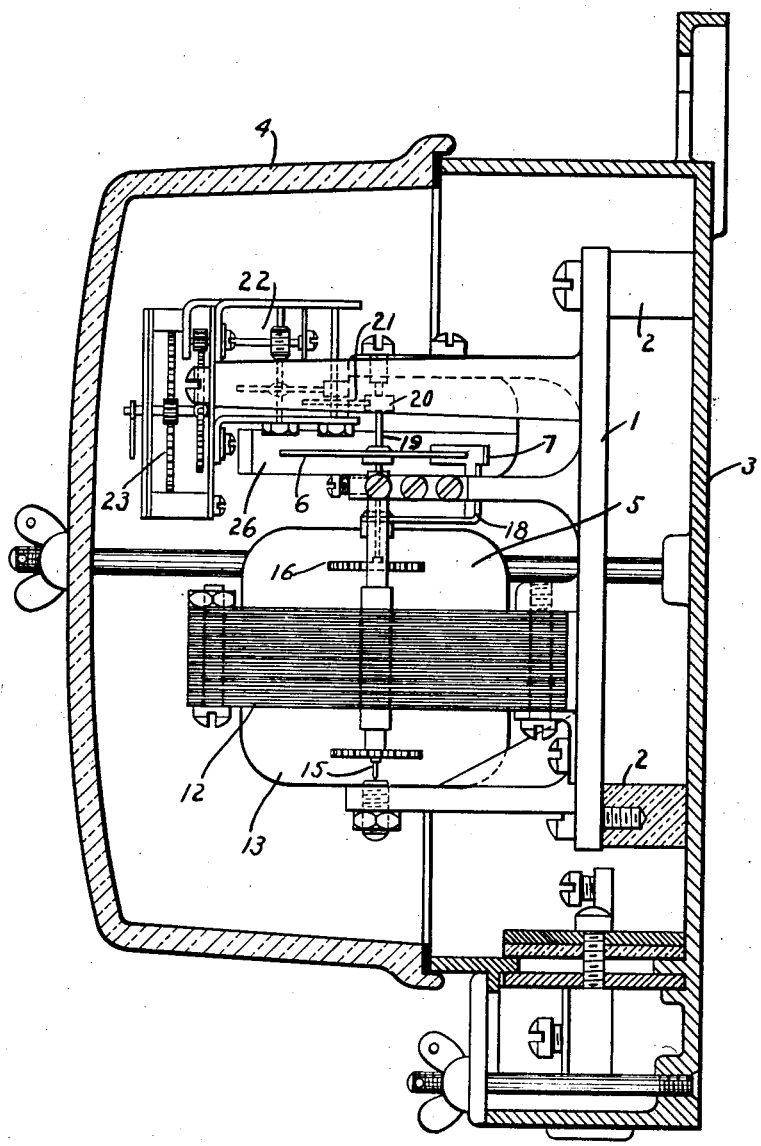
Figure 3:
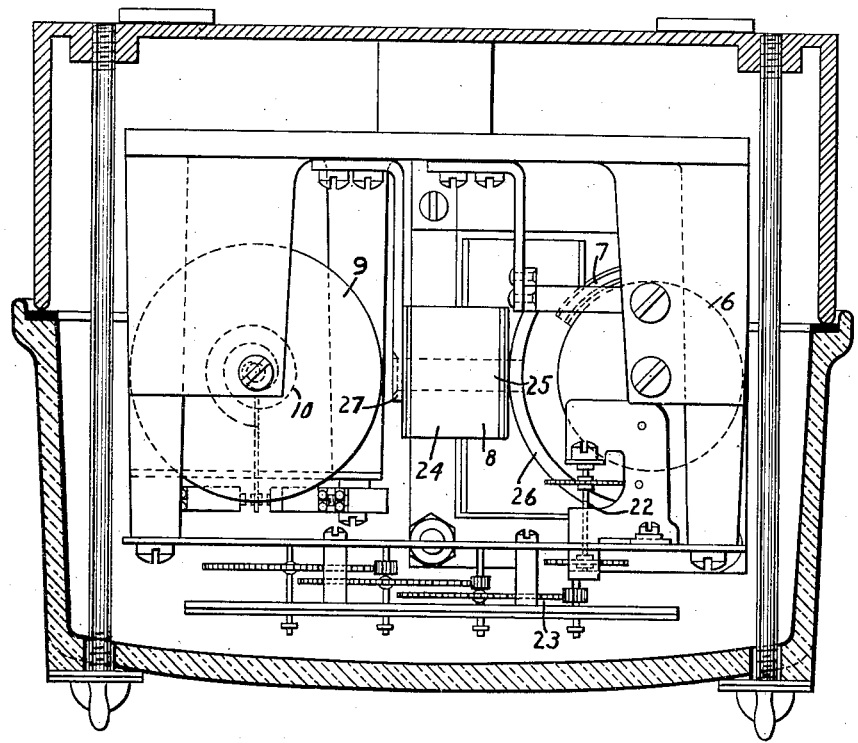
Figure 4:
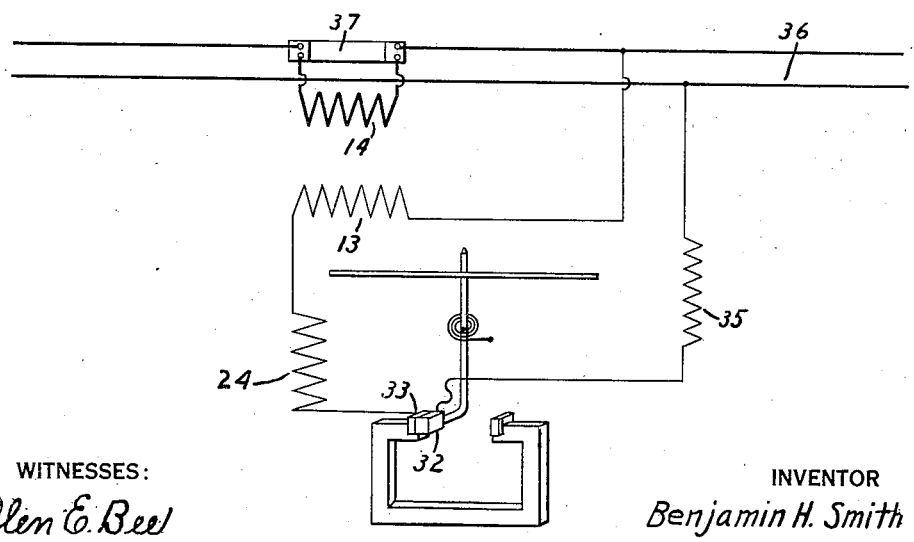

Figure 1 of the accompanying drawings is a front elevational view of a measuring instrument embodying my invention. Fig. 2 is a side view, partially in elevation and partially in section, of the instrument shown in Fig. 1. Fig. 3 is a top view, partially in plan and partially in section, of the instrument shown in Figs. 1 and 2, and Fig. 4 is a diagram illustrating the connection of the various windings embodied in the instrument shown in Figs. 1, 2 and 3.

An instrument-supporting plate or member 1 is mounted on projections 2 in the base portion of a casing 3 that is provided with a cover 4 for protecting the instrument from contact with external objects and for precluding the admission of dust and other foreign particles thereto.

The instrument comprises, in general, an indicating device 5, a rotatable magnetizable member 6, a clutch 7, of flexible magnetizable material, an electromagnet 8 for actuating the clutch, an oscillating member 9 that is adapted to be actuated in the one direction by the electromagnet 8 and in the other direction by a spring 10, and a contact device 11 for controlling the circuit of the electromagnet 8 and the indicating device 5.

The indicating device 5 comprises a magnetizable core member 12 having a circular air gap therein (not shown), a stationary potential winding 13 and a movable current winding 14 that is disposed in the air gap. The winding 14 is mounted on a shaft 15 upon which are also mounted corresponding ends of springs 16, the other ends of which are connected to stationary members 17. The clutch member 7 is operatively connected to an arm 18 that is mounted on the shaft 15. The rotatable magnetizable member 6 is mounted on a shaft 19 that is disposed in direct alinement with the shaft 15 and upon which is also mounted a pinion 20. The pinion 20 is adapted to be engaged by a gear wheel 21 which, through a gear mechanism 22, is adapted to actuate an integrating device 23.

The electromagnet 8 comprises a winding 24, a magnetizable core member 25 having a pole piece 26 of substantially arc-shape at the one end and a substantially flat pole piece 27 at its other end. The pole piece 26 is concentric with respect to a portion of the magnetizable member 6, and, when the winding 24 is energized, it is adapted to so magnetize the members 6 and 7 that the clutch member 7 will engage the magnetizable member 6 for the purpose of turning the same.

The oscillating member 9 is provided with a magnetizable projection 28 that is adapted to be attracted by the pole piece 27 of the electromagnet 8. The member 9 is mounted on a shaft 29 to which is also connected one end of the spring 10, the other end of which is connected to a movable member 31 that is provided with a contact member 32, at its lower end. The contact member 32 is adapted to move between the two members 33 and 34 of the contact device 11, the member 33 of which may constitute, in connection with the movable contact member 22, the separable terminals of a circuit 34 comprising the windings 13 and 24, and a resistor 35. This circuit, as shown in Fig. 4 of the drawings, is connected in shunt relation to a circuit 36, the power traversing which is to be measured. The current winding 14 of the indicating device 5 may be connected to a current shunt 37 that is arranged in series relation with one conductor of the circuit 36.

The members 32, 33 and 34 of the contact device 11 are preferably constructed of magnetic material and coated with some good conducting substance, and a permanent magnet 38 is so disposed with respect to the members 32, 33 and 34 that, when the member 32 engages either of the members 33 and 34, it is held in engagement therewith until the spring 10 has been so tensioned, by reason of the movement of the member 9, as to be quickly disengaged from the same.

Under normal conditions, the contact members 32 and 33 are in engagement and the windings 13, 14 and 24 are energized. Since the windings 13 and 14 are potential and current windings, respectively, they will coact to cause the arm 18 and, consequently, the clutch 7 to be moved a distance proportional to the power traversing the circuit 36. However, since the winding 24 is also energized, the clutch 7 will engage the magnetizable member 6 and thus actuate the integrating device 23 in accordance with the energy to be measured. Since the winding 24 is energized, its pole piece 27 will attract the projection 28 on the member 9 and so turn the same that the spring 10 will be tensioned sufficiently to effect the disengagement between the contact members 32 and 33. When the contact members 32 and 33 are disengaged, the circuit comprising the winding 13 is opened and the springs 16 cause the winding 14 to return to its initial position. However, the winding 24 is also open-circuited by the same operation and, consequently, the clutch member 7 is disengaged from the magnetizable member 6 and permits the latter to remain stationary, while the member 7 returns, with the winding 14, to its initial position. When the circuit of the winding 24 is opened, the pole piece 27 does not attract the projection 28, and the spring 10 permits the member 9 and, consequently, the contact member 32 to be disengaged from the member 34 of the contact device 11. After the member 9 has returned to its initial position, the contact member 32 again engages the stationary contact member 33 and thereby completes the circuit 34. Thus, the windings 13 and 24 will be again energized, and the integrating device 23 will be advanced by periodic steps an amount proportional to the power traversing the circuit 36. That is, the oscillating device 9 is adapted to cause the circuit to be completed and the clutch member 7 to engage the magnetizable member 6 for predetermined equal intervals of time, and, since the amplitude of movement of the member 7 is proportional to the power traversing the circuit 36, the integrating device 23 will accurately record the energy to be measured.

Since the magnetizable core member 12 is always worked in the same direction with respect to its magnetization curve, the ill effects of remanence therein will not obtain. However, by the use of the core member 12, relatively small windings may be used and, consequently, less current is necessary to operate the instrument. Thus, the winding 14 may be connected to the current shunt 37 in preference to causing the total current to be measured to traverse the instrument. In view of this, the instrument may be small in structure and inexpensive to construct.

I do not limit my invention to the particular structure illustrated, as it may be variously modified without departing from the spirit and scope of the same, as set forth in the appended claims.

I claim as my invention:—

1. In a meter for an electric circuit, the combination with a member adapted to be moved in accordance with the power traversing the circuit, and an integrating device, of an oscillating member, contact members actuated by the oscillating member, and means for actuating the oscillating member and for periodically securing the integrating device to the movable member.

2. In a watthour meter, the combination with a movable magnetizable member and an integrating device, of an oscillating member, contact members actuated by the oscillating member, and a single means for actuating the oscillating member and for periodically connecting the movable magnetizable member to the integrating device.

3. In a watthour meter, the combination with an indicating wattmeter, and an integrating device, of a spring-restrained oscillating member for controlling the circuit of the wattmeter, and a single means for actuating the oscillating member and for controlling the connection of the wattmeter to the integrating device.

4. A watthour meter comprising a magnetizable member adapted to be moved a distance in accordance with the power to be measured, an integrating mechanism, a spring-restrained fly wheel, contact members actuated by the fly wheel, a winding for actuating the fly wheel and for operatively connecting the magnetizable member to the integrating device, said contact members being adapted to control the circuit of the said winding.

5. A watthour meter comprising relatively movable current and potential windings, a magnetizable member actuated in accordance with the relative movement of the windings, an integrating device, a clutch for periodically connecting the integrating device to the magnetizable member, means for actuating the clutch, and a single means for controlling the said actuating means and the circuit of the potential winding.

6. The combination with an indicating wattmeter and an integrating device, of a magnetic clutch for operatively connecting the movable member of the wattmeter and the integrating device together during predetermined periods of time, and means for open-circuiting a portion of the wattmeter windings when the integrating device is disconnected therefrom.

7. The combination with a stationary potential winding, a movable current winding and an integrating device, of a clutch for operatively connecting the movable winding to the integrating device for predetermined periods of time, an oscillating member, means for actuating the oscillating member and the clutch device, and means actuated by the oscillating member for controlling the said means for actuating the oscillating member and the circuit of the potential winding.

8. The combination with a stationary potential winding, a movable current winding and an integrating device, of a clutch for operatively connecting the movable winding to the integrating device for predetermined periods of time, an oscillating member, an electromagnet for actuating the clutch and the oscillating member in one direction, a spring for actuating the oscillating member in the other direction, and contact members actuated by the oscillating member for controlling the circuit of the electromagnet and the potential winding.

9. The combination with an indicating instrument, and an integrating device, of a clutch for operatively connecting the instrument to the integrating device for predetermined intervals of time, an oscillating member, and an electromagnet controlled by the oscillating member for controlling the operation of the clutch.

10. The combination with an indicating instrument, and an integrating device, of means for operatively connecting the instrument to the integrating device for periodic periods of time, and oscillating means for controlling the connecting means.

11. In a watthour meter for an electric circuit, the combination with a member adapted to be periodically moved a distance proportional to the power traversing the circuit, and an integrating mechanism, of means for periodically connecting the integrating mechanism to the movable member, and an oscillating means for controlling the connecting means.

12. In a watthour meter for an electric circuit, the combination with a member adapted to be periodically moved a distance proportional to the power traversing the circuit, and an integrating mechanism, of a clutch for connecting the integrating mechanism to the movable member, and means for periodically actuating the clutch, and an oscillating means for controlling the clutch.

In testimony whereof I have hereunto subscribed my name this 30th day of June, 1917.

BENJAMIN H. SMITH.